United States Patent [19]

Delves

[11] 4,052,958
[45] Oct. 11, 1977

[54] APPARATUS FOR CONTROLLING THE SIZE OF A GAP

[75] Inventor: Elsworth Richard Delves, Lower Hackworth Village, England

[73] Assignee: Purpose Engineers Limited, Little Eaton, England

[21] Appl. No.: 645,286

[22] Filed: Dec. 29, 1975

[51] Int. Cl.² ............................................. B05C 11/04
[52] U.S. Cl. .................................. 118/119; 118/126; 118/412
[58] Field of Search ............. 118/413, 414, 120, 123, 118/119, 126, 412, 7; 68/258; 100/170, 291

[56] References Cited

U.S. PATENT DOCUMENTS

| | | | |
|---|---|---|---|
| 2,069,322 | 2/1937 | Mellor et al. | 118/413 |
| 2,474,691 | 6/1949 | Roehm | 118/126 X |
| 2,695,004 | 11/1954 | Montgomery et al. | 118/123 X |
| 2,836,221 | 5/1958 | Bove | 118/414 X |
| 3,279,424 | 10/1966 | Brown, Jr. et al. | 118/414 X |
| 3,580,794 | 5/1971 | Mintz | 100/291 X |
| 3,605,687 | 9/1971 | Russell | 118/262 |
| 3,820,502 | 6/1974 | Castillo et al. | 118/6 |

*Primary Examiner*—John P. McIntosh
*Attorney, Agent, or Firm*—Michael J. Striker

[57] ABSTRACT

Apparatus for controlling the depth of material laid on a web and comprising a head for laying the material, an arrangement for continuously moving the web past the head, first and second members defining an extrusion gap for receiving the web, and a control device arranged to effect movement of one member relative to the other to vary the size of the gap, the control device comprising a fluid-pressure operated piston and cylinder unit including a plurality of relatively movable cylinders and pistons individually extensible and retractable to vary the length of the unit, and a switching arrangement for individually operating the cylinders.

8 Claims, 7 Drawing Figures

APPARATUS FOR CONTROLLING THE SIZE OF A GAP

This invention relates to apparatus for controlling the size of a gap, for example, for controlling the depth of extrusion. In this specification, "extrusion" is used to mean the carrying of any fluid material through a constricted gap. One example is the laying of a given thickness of material on a web by extrusion through a gap as carried out in the manufacture of leather substitute. Another example is the manufacture of vinyl plastics coated wallpaper involving extrusion between two rollers to effect coating of a paper web. In such manufactures, it is important that the size of an extrusion gap is accurately controlled and the present invention provides apparatus which can be used to permit such accurate control.

In accordance with this invention, apparatus for controlling the size of a gap comprises first and second members which directly or indirectly define the gap, the members being relatively movable to adjust the size of the gap, and a control device arranged to effect said adjustment movement, the control device comprising a fluid-pressure operated piston and cylinder unit including a plurality of relatively movable cylinders individually extensible and retractable to vary the length of the unit, and switch means for individually operating the cylinders.

The control device preferably includes a ramp surface serving to convert variation in length of the unit to a proportional reduced incremental movement, of said one of the members.

The gap may be defined, for example, between a pair of rollers, or between a blade and a roller, or between a web, supported by two rollers, and a blade, or between two dies of an extrusion mould.

The invention may reside in apparatus for controlling the depth of material, laid on a web, comprising a head for laying the material, means for continuously moving the web past the head, first and second members defining an extrusion gap for receiving the web, and a control device arranged to effect movement of one of the members relative to the other to vary the size of the gap, the control device comprising a fluid-pressure operated piston and cylinder unit including a plurality of relatively movable cylinders individully extensible and retractable to vary the length of the unit, and switch means for individually operating the cylinders.

Reference will now be made to the accompanying drawings, wherein:-

Figure 1:
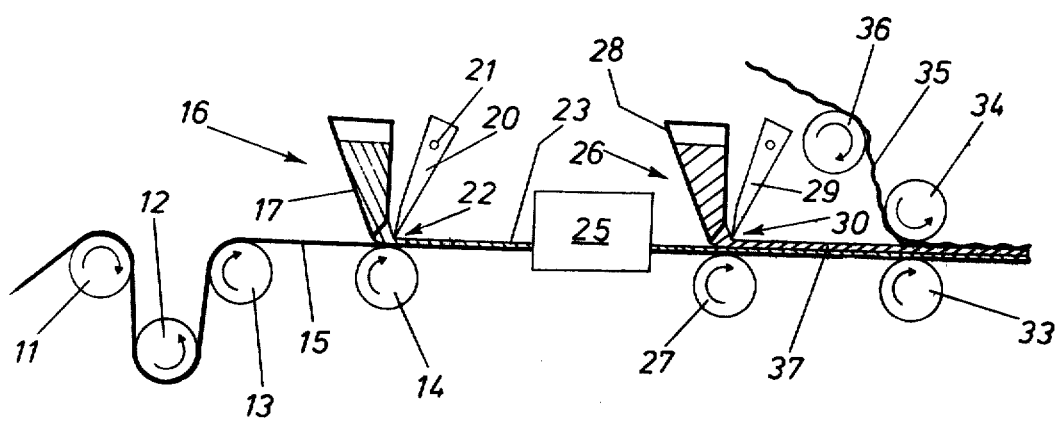
FIG. 1 is a diagrammatic illustration of apparatus for making leather substitute.

Referring to FIG. 1, there are shown feed rollers 11, 12, 13, which feed a web 15 of silicone impregnated paper to a support roller 14 of a plastics laying head 16. The head 16 includes a hopper 17 from which the plastics material issues in fluid condition and a blade 20, which is supported by lugs at 21. The blade is arranged above the support roller to define an extrusion gap 22 therewith. Movement of the web draws plastics material deposited on the web through the extrusion gap, so that the depth of material on the web is controlled by the size of the gap 22.

The web 15, with its layer 23 of plastics material, is fed through an oven arrangement 25 to cure the plastics material, which defines a flexible layer of the final product.

From the oven, the web 15 passes beneath an adhesive laying head 26 over a further support roller 27. This head is similar to the plastics laying head 16 and includes a hopper 28 and a blade 29, defining an extrusion gap 30 with the roller 27.

From the adhesive laying head, the web passes through the nip of a pair of rollers 33, 34 and a textile web 35 is passed through the nip from a feed roller 36. The textile web is adhered to the plastics layer 23 by the adhesive layer 37. The gap between the rollers 33, 34 controls the depth of penetration of the textile web into the adhesive and the final extrusion thickness of the material is thereby controlled. After this step, the material may be embossed to provide a leather-like grain.

Figure 2:
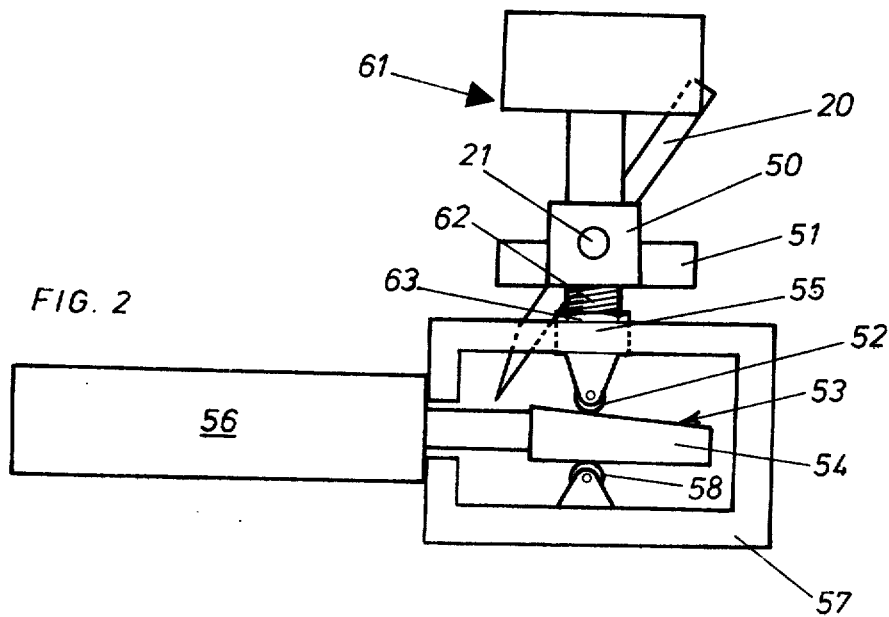
FIG. 2 is a diagrammatic illustrtion of a part of the apparatus with a control device for varying the depth of an extrusion gap.

Referring to FIG. 2, the blade 20 of the plastics laying head 16 is shown mounted by its lugs 21 (only one shown) on a slide 50 in turn mounted on a frame member 51. An adjusting device is provided comprising a frame 57 mounting a multiple piston and cylinder unit 56. The output piston of the unit carries a wedge 54 forming a ramp surface 53. The wedge is located between two needle rollers 52, 58, the second 58 of which is fixed to the frame 57 and the first 52 of which is mounted on a slidable carrier 55 and seats on the ramp surface 53. A coarse-adjustment screw 62 engages with the carrier 55 and is lockable in a predetermined relative position by a lock nut 63. The slide 50 seats on the screw 62. The multiple piston and cylinder unit 56 provides fine adjustment of the position of the blade through the agency of the wedge 54 to control the depth of extrusion of the plastics layer.

There is also provided a piston and cylinder unit 61 exerting a reaction force on the slide 50. The force provided by this unit 60 is overcome by operation of either the multiple unit 56 or the coarse adjustment unit 62, 63.

A similar arrangement may be provided on the adhesive laying head 26 or on the roller 33 or 34 as seen in FIG. 1. The control device could act on the support roller 14 instead of the blade.

A multiple unit, together with a wedge, may also be used to control the angular position of the blade, by pivoting the blade about the lugs 21.

Figure 3:
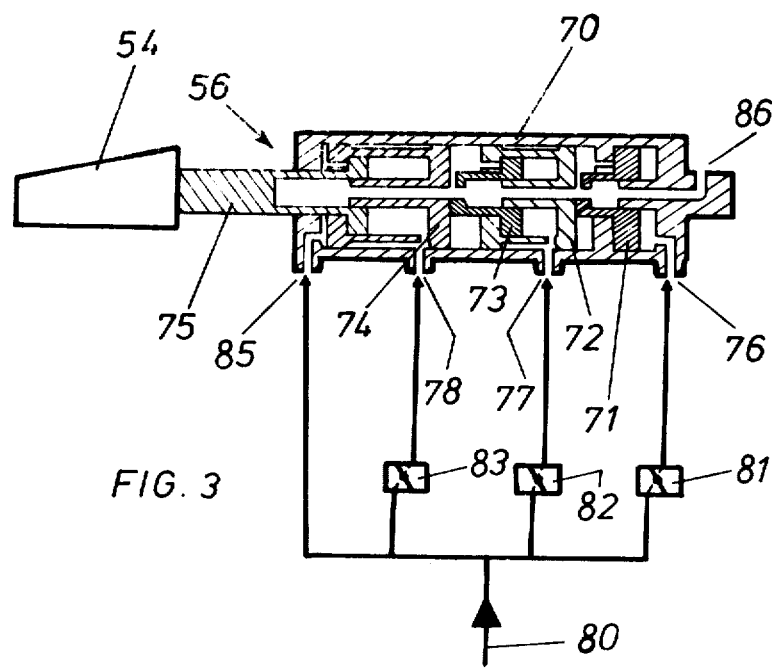
FIG. 3 is a more detailed view of a multiple piston and cylinder unit of the control device showing a switch arrangement.

Referring now to FIG. 3 where the multiple piston and cylinder unit 56 is shown in more detail. It may be seen that the unit 56 includes a main cylinder 70 housing a first piston 71 movable between predetermined limits. A first sub-cylinder 72 is slidable in the main cylinder 70 and abuts the first piston 71 for movement thereby. The first sub-cylinder 72 houses a second piston 73 and a second sub-cylinder 74 is provided in the main cylinder for movement by the second piston 73. This second sub-cylinder 74 also mounts a third piston 75, which is connected to the wedge 54. A separate air inlet 76, 77, 78, resepctively, is provided to result in a force acting on the piston 133 which extend each piston 71, 73, 75, individually and each air inlet is connected to a pneumatic source 80 by a respective valve switch 81, 82, 83. Each piston can thereby be extended individually to provide a predetermined extension of the unit as a whole (i.e. the extension of the third piston 75) by actuation of the appropriate valve switch 81, 82, 83. The unit 56 is under pneumatic bias to return the pistons to their retracted positions with the corresponding valve switch 81, 82, 83 closed. This bias is provided at air inlet 85 by the same pneumatic supply 80, the differential piston areas permitting the bias to be over-ridden. A port 86 is provided vented to atmosphere.

Figure 4:
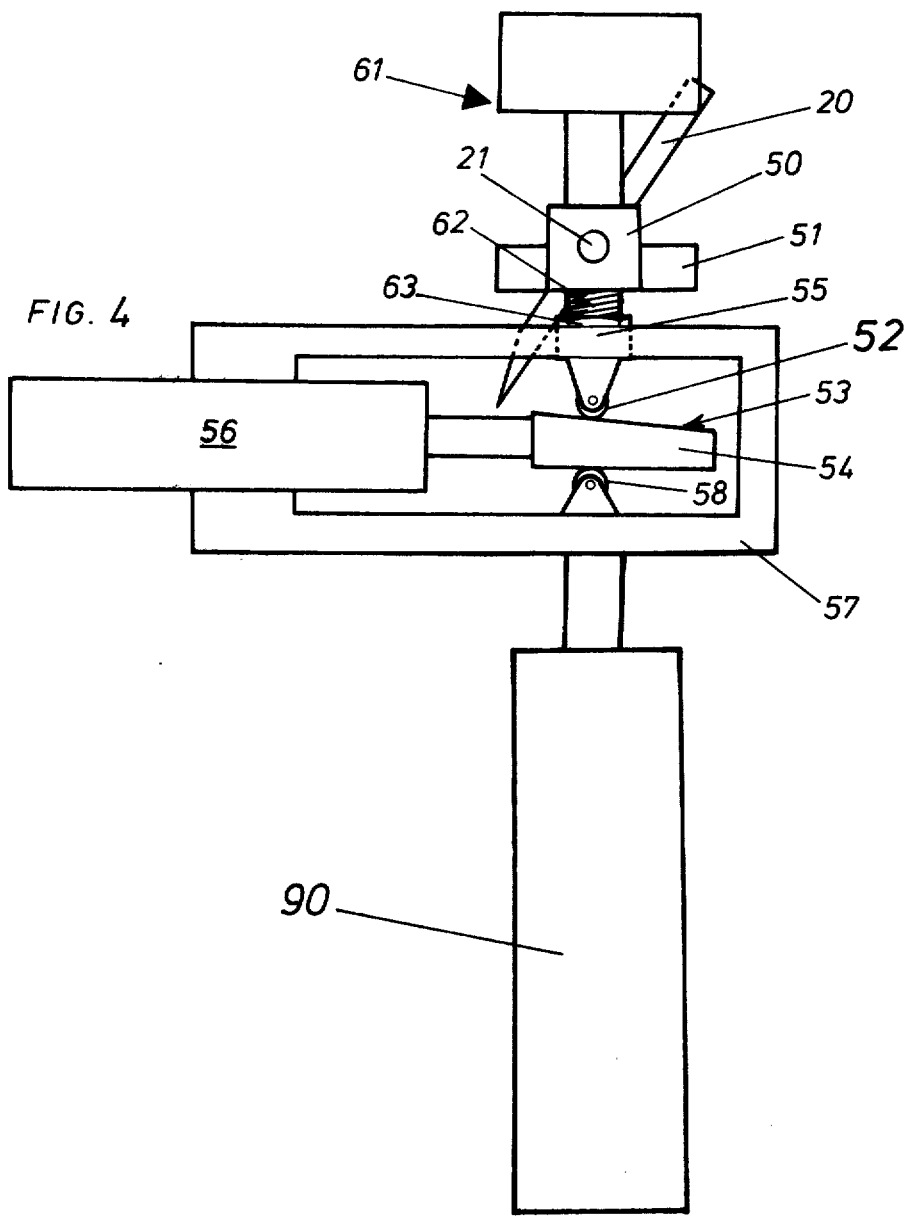
FIG. 4 is a diagrammatic illustration of a modification of the control device of FIG. 2.

Referring now to FIG. 4, a similr arrangement to FIG. 2 is shown, wherein a coarse adjustment multiple piston and cylinder unit 90, similar to that shown in FIG. 3, is provided. With this arrangement, coarse predetermined increments of movement of the blade can be provided by the unit 90 and fine increments provided by the unit 56. Coarse adjustment may be provided to facilitate clearing or to lift the blade 20 over a particle, which otherwise might provide a score along the extruded material.

Figure 5:
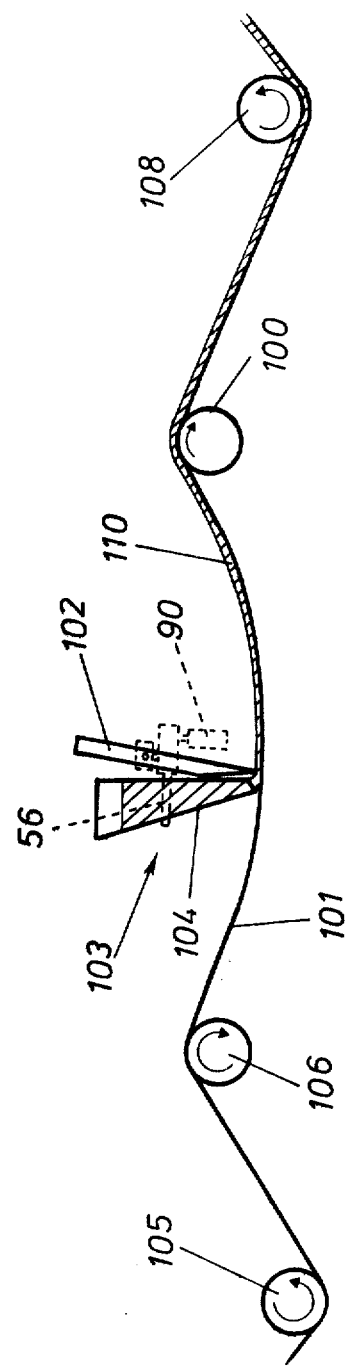
FIG. 5 is a diagrammatic illustration of apparatus for making, for example, a tarpaulin, using the control device of FIG. 4.

As shown in FIG. 5, the extrusion gap may be indirectly provided by rollers 100, 106. In this apparatus, a web 101 is fed past a head 103 including a blade 102 and a hopper 104 by rollers 105, 106, 100 and 108. Plastics material is extruded between the blade 102 and the web 101 to form a layer 110. The height of the blade is controlled by an arrangement as shown in FIG. 4. This apparatus is used for the manufcture of directly impregnated webs such as tarpaulin. The web may be supported by a band over the rollers 106, 100, whose tension is adjustable. It is envisaged that a single control device may be used to effect the operation described with respect to both FIG. 4 and FIG. 5, as desired by providing for movement of the control device. The coarse adjusting device 90 need only be used in manufacturing tarpaulin, for example.

Figure 6:
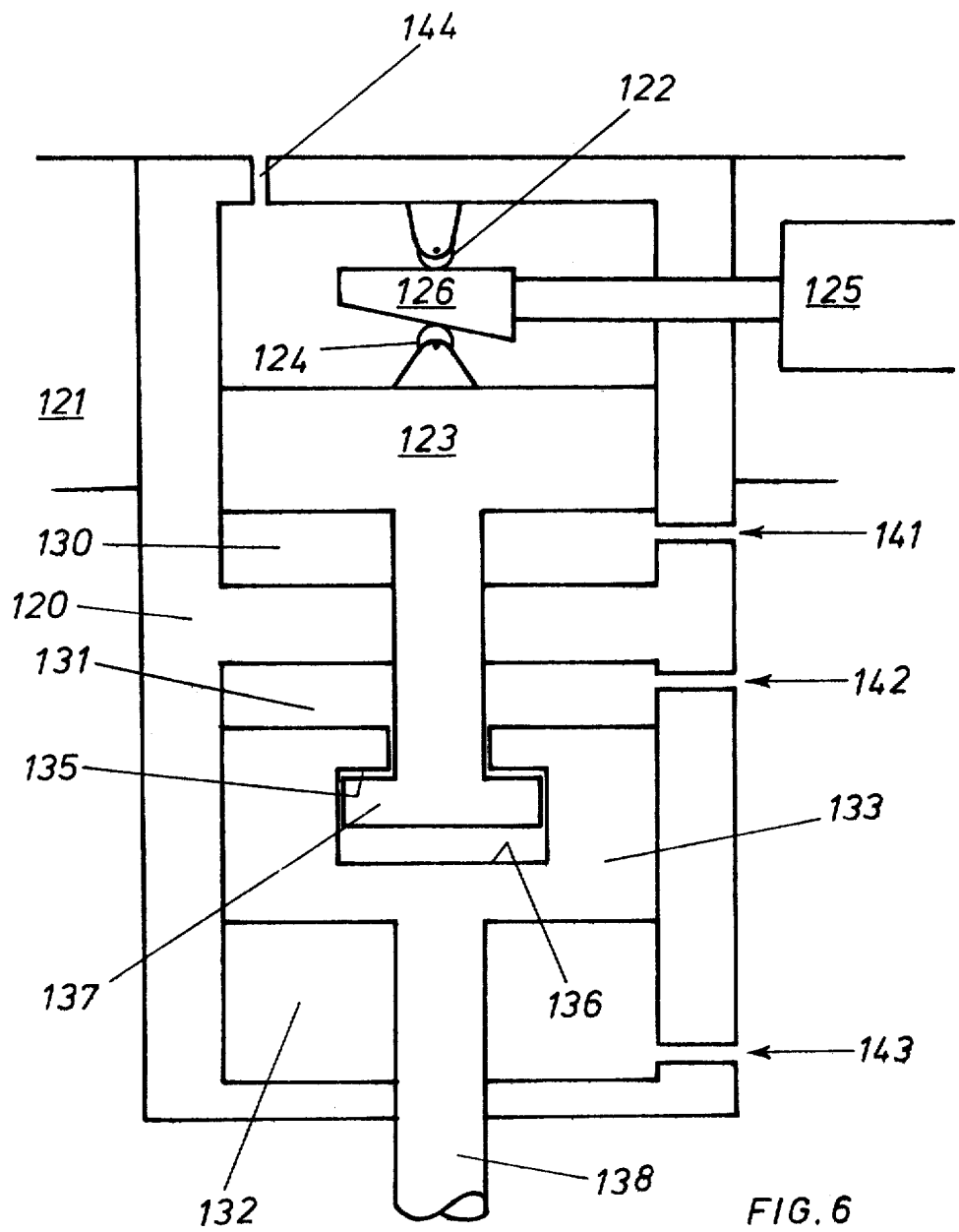
FIG. 6 is a diagrammatic illustration of a modified apparatus according to the invention.

Referring now to FIG. 6, a main cylinder 120 is shown, mounted on the body 121 of a machine for coating a web with plastics material. The cylinder 120 fixedly supports an upper needle roller 122 and a first piston 123, in the cylinder 120, supports another needle roller 124. A multiple cylinder 125, as shown in FIG. 3, is provided, together with a wedge 126 engaged between the rollers 122, 124. The cylinder 120 defines first and second chambers 130, 131, the first of which contains the first piston 123. A second piston 133 is provided and defines with the cylinder 120, the second chamber 131 and a third chamber 132. The second cylinder has opposite shoulders 135, 136 between which is received a head 137 on an extension of the first piston 123. The shoulders 135, 136 limit relative movement of the pistons 123, 133. The second piston 133 carries an output shaft 138 which supports a slide such as 50, as described with respect to FIG. 2. The slide 50 and blade are therefore suspended in this example. Respective first, second and third ports 141, 142, 143 lead to the first second and third chambers, and a vent 144 to atmosphere connects with the chamber containing the wedge 126. A pneumatic bias is applied at the first port 141 to hold the lower roller 124 against the wedge 126. A similar bias is applied at the second port, 142 so that the shoulder 135 contacts the head 137. On operation of the multiple cylinder unit 125 the output shaft can therefore be raised or lowered by small increments. Application of pressure at the third port 143 will result in a force acting on the piston 133 which overcome the press force acting on the piston 133 by the pressurized medium admitted through the second port 142 to raise the second piston to the extent permitted by the shoulder 136, acting on the head 137, to provide a coarse adjustment of the blade 20.

Figure 7:
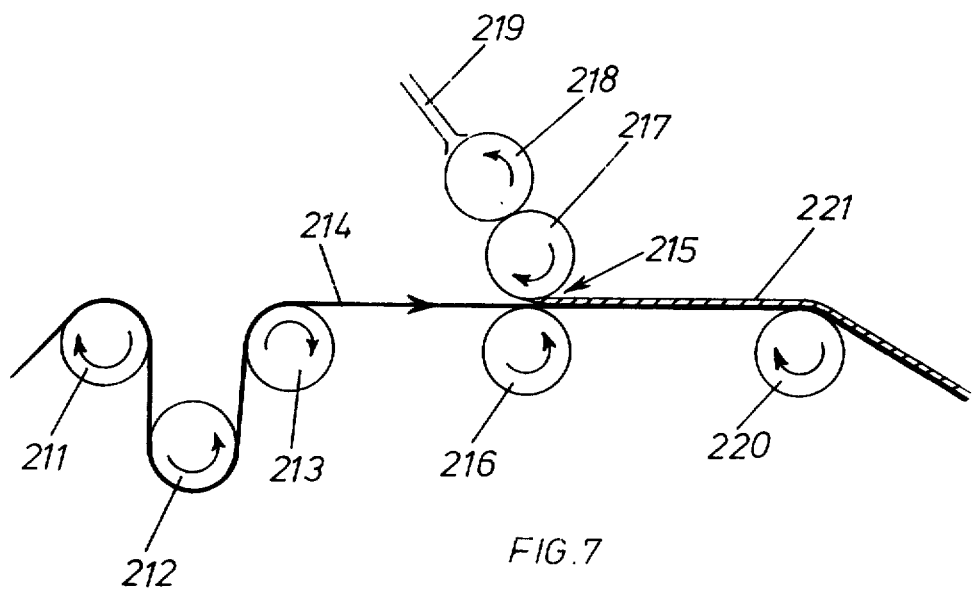
FIG. 7 is a diagrammatic illustration of apparatus for making a resincoated paper.

Referring to FIG. 7, there is illustrated apparatus for coating a paper web with a resin, such as a vinyl resin in making wallpaper. The apparatus comprises feed rollers 211, 212, 213, which feed a paper web 214 through an extrusion gap 215 between a support roller 216 and a transfer roller 217, the web being led from the machine by a roller 220. The transfer roller transfers liquid plastics resin to the web, the thickness of the layer being determined by the extrusion gap 215. The liquid is fed to the transfer roller 217 by a take-up roller 218 to which is fed the resin from a feed device 219. A multiple piston and cylinder unit as shown in FIG. 3 is set up generlly as shown in FIG. 2 to adjust the position of the transfer roller 217 with respect to the support roller 216, or vice versa.

The described appartus in each example permits control of manufacture of articles involving extrusion with great ease, control being provided simply by operation of the switch valves, and with great accuracy.

What I claim is:

1. In an apparatus for forming a continuous layer of material on a major surface of a web, a conbination comprising a laying head for discharging the material; means for continuously advancing the web past said laying head so that the material discharged by the latter deposits on one major surface of the web; means for forming the deposited material into a layer on the one major surface of the web, including a support and a forming member mounted on said support for movement toward and away from the one major surface of the web in juxtaposition therewith to bound an extrusion gap with the same; and means for moving said forming member relative to the web to thereby control the size of said extrusion gap and thus the thickness of the layer being formed, including an elongated cylinder-and-piston unit having a housing mounted on said support and a plurality of cylinder-and-piston sub-units accommodated in said housing longitudinally adjacent one another, a terminal one of said sub-units having a projection extending longitudinally outwardly of said housing, said moving means further including means for admitting pressurized medium into said housing to act on said sub-units to extend and retract the same, switching valve means in said admitting means for individually controlling the admission of the pressurized medium to said sub-units to individually extend and retract the same and thus incrementally extend and retract said projection, and a wedge member on said projection having a ramp in contact with said forming member, said ramp converting the incremental extension and retraction of said projection into a proportionally reduced incremental movement of said forming member.

2. In an apparatus for forming a continuous layer of material on a major surface of a web, a combination comprising a laying head for discharging the material; means for continuously advancing the web past said layer head so that the material discharged by the latter deposits on one major surface of the web; means for forming the deposited material into a layer on the one major surface of the web, including a support and two forming members mounted on said support in juxtaposition with one another and the respective major surfaces of the web, at least one of said forming members for movement toward and away from the web, a respective forming member bounding an extrusion gap with the one major surface of the web; and means for moving said one forming member relative to the web to thereby control the size of said extrusion gap and thus the thickness of the layer being formed, including an elongated cylinder-and-piston unit having a housing mounted on said support and a plurality of cylinder-and-piston sub-units accommodated in said housing longitudinally adjacent one another, a terminal one of said sub-units having a projection extending longitudinally outwardly of said housing, said moving means further including means for admitting pressurized medium into said housing to act on said sub-units to extend and retract the same, switching valve means in said admitting means for individually controlling the admission of the pressurized medium to said sub-units to individually extend and retract the same and thus incrementally extend and retract said projection, and a wedge member on said projection having a ramp in contact with said one forming member, said ramp converting the incremental extension and retraction of said projection into a proportionally reduced incremental movement of said one forming member.

3. A combination as defined in claim 2, wherein each of said sub-units includes an auxiliary cylinder and an auxiliary piston which act on the adjacent sub-unit in the longitudinal direction of said unit to displace such adjacent sub-unit in the longitudinal direction upon switching of said switching valve means associated with said sub-unit.

4. A combination as defined in claim 2, wherein said respective forming member is a roller, and wherein the other forming member is a support roller supporting the web.

5. A combination as defined in claim 2, wherein said respective forming member is a blade; and wherein the other forming member is a support roller supporting the web.

6. A combination as defined in claim 2; and further comprising an additional cylinder-and-piston unit acting on said one forming member in direction opposite to the action of said ramp on said forming member, to press the latter into contact with the former.

7. A combination as defined in claim 2; and further comprising a screw adjustment device arranged between said support and said one forming member and operative for coarse adjustment of the size of said extrusion gap.

8. A combination as defined in claim 2; and further comprising a coarse adjustment cylinder-and-piston unit arranged between said support and said one forming member and operative for coarse adjustment of the size of said extrusion gap.

* * * * *